March 28, 1950     R. BURNES ET AL     2,502,367
VEHICLE
Filed Jan. 11, 1947     2 Sheets-Sheet 1
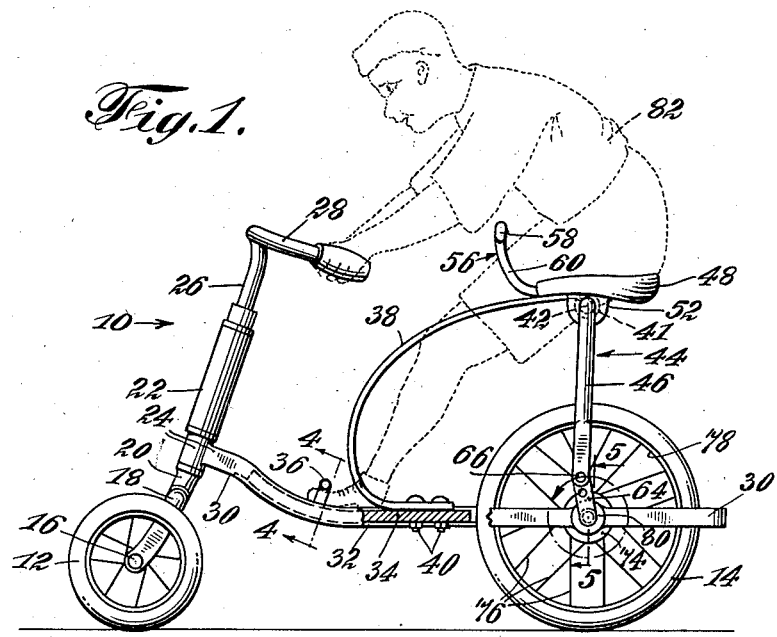
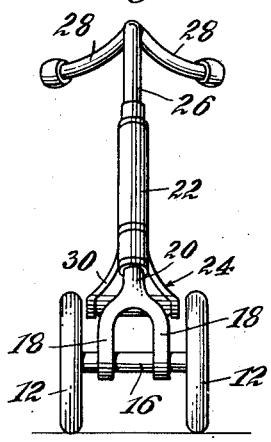
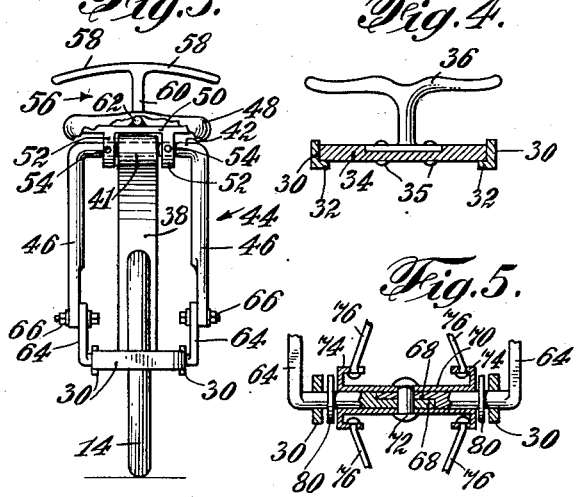
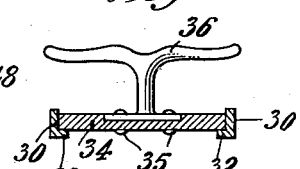
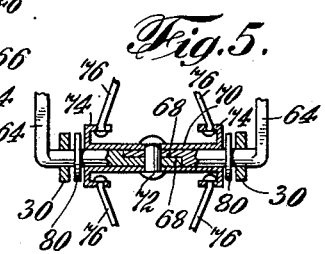
INVENTORS
*Ralph Burnes and*
BY *Stanley S. Harris*
their ATTORNEY March 28, 1950 R. BURNES ET AL 2,502,367
VEHICLE
Filed Jan. 11, 1947 2 Sheets-Sheet 2
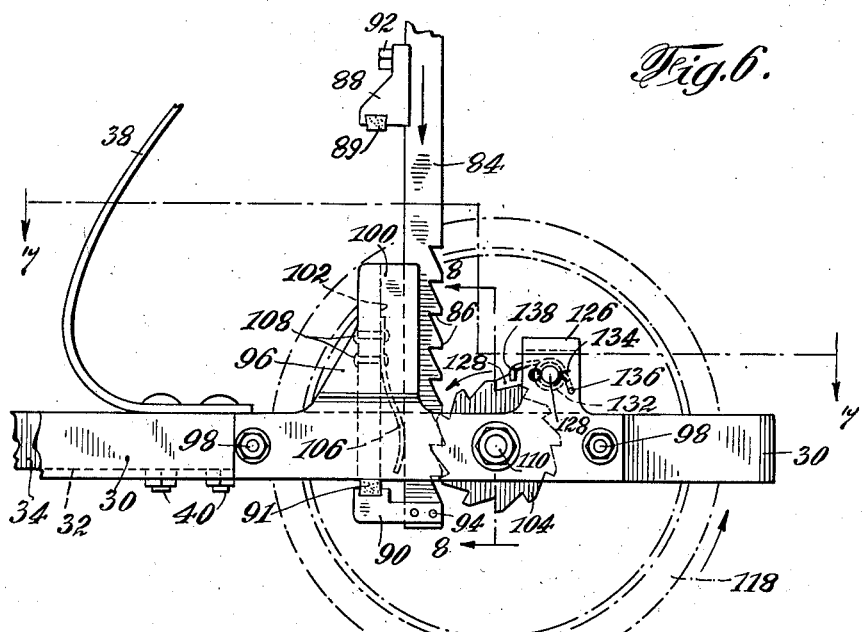
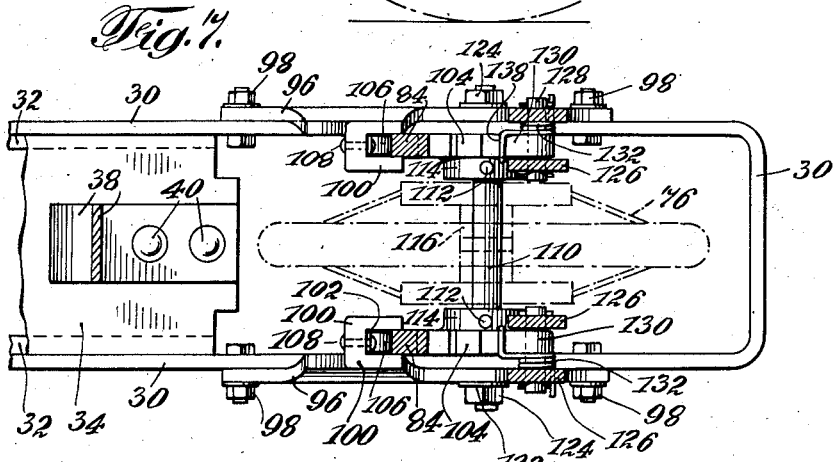
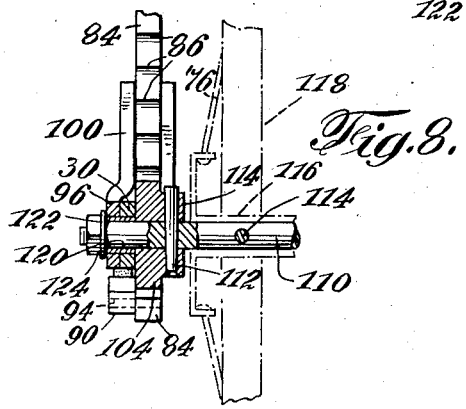
INVENTORS
Ralph Burnes and
BY Stanley S. Harris
their ATTORNEY Patented Mar. 28, 1950

2,502,367

UNITED STATES PATENT OFFICE 2,502,367

VEHICLE

Ralph Burnes and Stanley S. Harris, Brooklyn, N. Y.; said Harris assignor to said Burnes Application January 11, 1947, Serial No. 721,590

9 Claims. (Cl. 280—226)

This invention relates to vehicles, particularly to self-propelled vehicles, and has for its principal object to provide an improved tricycle in which propulsion thereof is obtained by the rider reciprocating the seat vertically.

Another object of the invention is to provide an improved body-propelled vehicle in which forward motion is continually assured.

Still another object of the invention is to provide an improved body-propelled vehicle in which the thighs and feet of the operator are so braced as to increase effective application of the driving force.

Yet another object of the invention is to increase the operative safety of body-propelled vehicles.

A further object of the invention is to provide a three wheeled vehicle having two steering wheels and a driving wheel articulated by vertical reciprocating motion of a resiliently supported saddle.

With the above objects in view, a preferred embodiment of the invention discloses a tricycle comprising a frame with a pair of front steering wheels and a single rear driving wheel articulated through a crank by vertical reciprocating movement of a saddle carried upon one end of a leaf spring, the other end of the spring being bent upon itself and secured to a platform disposed on the frame intermediate the front and rear wheels. In front of the saddle is shown an arcuate two pronged member for engaging the thighs and in front of the leaf spring on the platform is a double pronged stirrup for engagement with the feet of the propellant, the member and stirrup affording means for increasing the safety of operation of the vehicle in the event of a sudden stop and yet increasing the ease with which the vehicle may be propelled.

In another embodiment the driving wheel is connected through a ratchet wheel and spring biased rack to the saddle for providing forward propulsion of the tricycle in all cases.

A more complete understanding of the invention will be obtained from the following description and drawings, in which:

Fig. 1 is a side view of the vehicle showing a propellant seated thereon,

Figs. 2 and 3 are respectively front and rear views of the vehicle,

Fig. 4 is a slightly enlarged sectional view taken along line 4—4 of Fig. 1 showing the stirrup mounted upon the platform of the frame, Fig. 5 is a slightly enlarged sectional view taken along line 5—5 of Fig. 1 showing in detail the construction of the driving wheel hub with connection thereof to the frame and crank, Fig. 6 is a side view of a rack and a ratchet wheel driving mechanism for the vehicle with the rack shown in the uppermost or resting position, Fig. 7 is a view, partly in section, taken along line 7—7 of Fig. 6, and Fig. 8 is a sectional view taken along line 8—8 of Fig. 6.

Referring now to the drawings, particularly to Figs. 1 to 5, inclusive, there is shown a vehicle 10 of the three wheeled type having a pair of steering wheels 12 at the front and a driving wheel 14 preferably larger than the steering wheels, at the rear. The steering wheels 12 are journalled on a shaft 16 which is carried at the lower end of a bifurcated element 18, such as a steering fork, the upper portion of which is constituted as a single tubular post 20 journalled in a tubular upstanding member 22 of the frame 24. The upper end of the tubular post 20 is adapted to frictionally receive a handle bar post 26 of a pair of steering handles 28, the handle bar post 26 being locked to the tubular post 20 in the usual manner (not shown), so that the front wheels 12 may be directed by manipulation of the handles 28, as is well known.

The frame 24 interconnecting the front and rear wheels 12 and 14, respectively, is of light construction and comprises, in general, flat side bars 30 connected at the front to the post 22 and looped around the rear of the driving wheel 14. The intermediate portions of the bars 30 are shown provided with inturned flanges 32 (Fig. 4) to facilitate mounting thereon an arcuately shaped platform 34 upon which is rigidly secured by rivets 35 a bifurcated stirrup 36 of approximately T configuration, as shown. The platform 34 may be secured to the bars 30 in any suitable manner, as by a frictional fit. It is to be noted that the stirrup 36 and platform 34 are so constituted that the propellant's feet (see Fig. 1) are adapted to rest on the platform with the cross bars of the stirrup above the shoe tops, the reason for which will appear hereinafter.

To the rear of the stirrup 36 is shown a flat resilient member, such as a leaf spring 38, one end of which is rigidly secured to the platform 34 by a pair of bolt-nut combinations 40. The leaf spring 38 is bent back upon itself arcuately, as shown, to pretension it and the other end thereof is looped around itself to form a bearing 41 for a cross-rod 42 of an inverted yoke member 44 having sides 46. To the cross-rod 42 is rigidly fastened a seat or saddle 48 having a frame 50 with a pair of spaced depending ears 52 disposed at the sides of the spring bearing 41. Pins 54 driven through the ears 52 and cross-rod 42 serve to prevent rotary motion being imparted to the saddle 48. Just ahead of the saddle, as seen in Fig. 1, is shown an arcuately shaped bifurcated member 56 having a pair of downwardly curved lateral arms 58 extending from the upper end of an arcuate rod 60 and a longitudinal rod 62 (Fig. 3) extending rearwardly from the lower end of rod 60, said longitudinal rod 62 being rigidly secured to the saddle frame 50 in any suitable and well known manner.

The lower ends of the sides 46 of the yoke 44 are pivotally connected to links 64 as by bolt-nut combinations 66, each link 64 being inwardly turned, passed through openings in the frame bars 30, (see Fig. 5) and provided with overlapping ends 68 to form a crank for the driving wheel 14. As seen in Fig. 5, the hub 70 of the driving wheel 14 is hollow and is adapted to receive the ends 68, being rigidly secured thereto by a pin 72. The hub 70 is also shown provided with angular inturned flanges 74 to which are connected the usual spokes 76, the other ends of the spokes being terminated in the rim 78 of the driving wheel 14 in the conventional manner. Interposed between the frame bars 30 and each side of the hub 70 are preferably shown washers 80. From the above, it is readily apparent that rotation of the links 64 will transmit corresponding rotative movement to the wheel 14.

The operation of the vehicle 10 will now be described. The propellant 82 seats himself upon the saddle 48 with his two feet resting upon the platform and under the stirrup 36 and with his thighs under lateral arms 58 and at each side of upstanding rod 60. It is thus seen that the propellant is firmly braced upon the vehicle and cannot be dislodged by a sudden stopping of the vehicle 10. The weight of the propellant 82 will force the yoke 44 and upper end of spring 38 downwardly, thereby revolving crank 64 and driving wheel 14 counterclockwise, in the direction of the arrow as viewed in Fig. 1. Upon reaching the lowermost position of the stroke of the crank 64, and it is to be noted at this point that the stirrup 36 prevents the feet of the propellant from leaving the platform 34, the propellant 82 will then raise himself thereby carrying upwardly with him the saddle 48, and yoke 44, in view of the engagement by his thighs with the T-shaped member 56. The potential energy of the spring 38 also assists in raising the saddle 48, which continues rotation of the crank 64 in the same direction until the top of the stroke is reached, after which the above operation is repeated to propel the vehicle 10 in a forward direction.

With the hereinbefore described arrangement forward propulsion of the vehicle 10 is not always certain and to assure such propulsion in all cases the embodiment shown in Figs. 6, 7 and 8 is provided. In these views the driving mechanism is the only portion of the vehicle 10 that is modified, the frame bars 30, spring 38, and saddle 48 being substantially identical. The lower portion of the yoke 44 is shown provided with a pair of racks 84 having teeth 86 facing towards the rear of the vehicle 10. An upper stop 88 with a resilient cushion 89 and a lower stop 90 with a resilient cushion 91 are shown rigidly secured to each of the racks 84 in any suitable manner, as by a bolt 92 and a pin 94. The racks 84 are adapted to be reciprocated vertically by the hereinbefore described movement of the saddle 48 and are guided in their movements by brackets 96 secured to the outer surfaces of frame bars 30 by bolt-nut combinations 98. Each bracket 96 is provided at its forward end with an upstanding U-shaped element 100 the outer arm of which is bent inwardly (see Fig. 8) just above the top edge of the frame bar 30 until it is flush with the outer face of the bar 30. As seen in Fig. 7, the opening 102 within the U-shaped element provides a guideway for the rack 84.

Each of the racks 84 is shown in mesh engagement with a pinion or ratchet wheel 104 and to facilitate upward movement of the rack an arcuate spring member 106 is secured at one end, as by pins 108, to the upstanding U-shaped element 100, the free end of the spring being bowed in such manner that the convex surface thereof is biased against the rack 84. It is readily seen that during downward movement the rack 84 will be forced into engagement with ratchet wheel 104, while during upward movement the rack may move freely by pressing against the spring 106. It is further seen that the rack is limited in its movement by the stops 88 and 90, the cushion 89 of the former striking the top of element 100 at the lowermost position of the rack and the cushion 91 of the latter striking the bottom surface of the bracket 96 and frame 30 at the uppermost position of the rack.

Each ratchet wheel 104 is rigidly secured to a shaft 110, as by a pin 112 press fit through aligned openings in the hub 114 thereof and shaft 110 (Fig. 8). The shaft 110 is in turn rigidly secured by a pin 114 press fit through aligned openings in the shaft and hub 116 of the driving wheel 118. Each end of the shaft 110 is journalled in a bearing 120 disposed in both the frame bar 30 and bracket 96, transverse movement of the shaft being prevented by a washer 122 and a nut 124 threadedly engageable therewith.

A second upstanding element 126 is shown integral with and adjacent the other end of bracket 96 for supporting a stud shaft 128 upon which is mounted a pawl 130 biased into engagement with the teeth of ratchet wheel 104 by a coiled spring 132. The upper portion of the upstanding element 126 is preferably shaped in the form of an inverted U to provide a bearing support for both ends of shaft 128, which ends are secured against endwise movement by cotter pins 134. As seen in Figs. 6 and 7, the outer end of coiled spring 132 is passed through an opening 136 in element 126 while the other end is tensionally disposed by a bend 138 upon the upper surface of pawl 130, the free end of which is thereby forced into engagement with the teeth of the ratchet wheel 104 in the conventional manner.

In operation, assuming the resting condition shown in Fig. 6, the propellant upon seating himself upon the saddle will drive the rack 84 downwardly with the result that ratchet wheel 104 will be rotated counterclockwise, as viewed in Fig. 6, and the vehicle 10 propelled in a forward direction. Upon the propellant raising his body in the hereinbefore described manner, the rack 84 will be retracted to the initial starting position after which the above cycle of operation is repeated.

Thus, it will be apparent that among others the objects of the invention, as especially aforementioned, are achieved. Obviously, numerous changes in construction and re-arrangement of the parts of the mechanism might be resorted to without departing from the spirit of the invention, as defined by the appended claims.

What is claimed is:

1. A vehicle comprising, in combination, a frame, a steering wheel and a driving wheel carried by said frame, a leaf spring bent back upon itself having one end thereof attached to the frame, a saddle connected to the other end of said spring, a driving member interposed between said saddle and said driving wheel, said driving member being adapted to rotate said driving wheel upon movement of said saddle in a downward and upward manner by a propellant, and transverse means rigidly coupled to said saddle for engaging the tops of the thighs of the propellant.

2. A vehicle comprising, in combination, a frame, a steering wheel and a driving wheel carried by said frame, a leaf spring bent back upon itself having one end thereof attached to the frame, a saddle connected to the other end of said spring, a driving member interposed between said saddle and said driving wheel, said driving member being adapted to rotate said driving wheel upon reciprocal movement of said saddle by a propellant, and a bifurcated element with transverse arms rigidly coupled to said saddle for engaging the tops of the thighs of the propellant.

3. A vehicle comprising, in combination, a frame, a steering wheel and a driving wheel carried by said frame, a leaf spring bent back upon itself having one end thereof attached to the frame, a saddle connected to the other end of said spring, a driving member interposed between said saddle and said driving wheel, said driving member being adapted to rotate said driving wheel upon reciprocal movement of said saddle by a propellant, a bifurcated element rigidly coupled to said saddle for engaging the thighs of the propellant, and a stirrup on said frame directly in front of the attached end of said spring for engaging the propellant's feet.

4. A tricycle comprising, in combination, a frame, a pair of steering wheels and a driving wheel carried by said frame, a leaf spring bent back upon itself having one end thereof attached to the frame, a saddle connected to the other end of said spring, a driving member interposed between said saddle and said driving wheel, said driving member being adapted to rotate said driving wheel upon reciprocal movement of said saddle by a propellant, a T-shaped element rigidly coupled to said saddle for engaging the thighs of the propellant, and a T-shaped stirrup on said frame directly in front of the attached end of said spring for engaging the propellant's feet, whereby the reciprocal movement of said saddle is under direct control of the propellant.

5. A vehicle comprising, in combination, a frame, a pair of steering wheels rotatably carried at one end of the frame, a driving wheel rotatably carried at the other end of said frame, a leaf spring bent back upon itself having one end attached to the frame, a saddle carried upon the other end of said spring, a crank on said driving wheel, a link interconnecting said crank and said saddle, a T-shaped stirrup on said frame directly in front of the attached end of said spring, and rigid bifurcated means connected to said saddle.

6. A vehicle comprising, in combination, a frame, a pair of steering wheels rotatably carried at one end of the frame, a single driving wheel rotatably carried at the other end of said frame, a leaf spring bent back upon itself having one end attached to the frame, a saddle carried upon the other end of said spring, an arm carried by and rotatable with said driving wheel, a link interconnecting said arm and said saddle, whereby said arm is rotated upon reciprocal movement of said link, a T-shaped stirrup on said frame in front of the attached end of said spring, and rigid bifurcated means at the front of said saddle.

7. A vehicle comprising, in combination, a frame, a pair of steering wheels rotatably carried at one end of the frame, a single driving wheel rotatably carried at the other end of said frame, a leaf spring bent back upon itself having one end attached to the frame, a saddle carried upon the other end of said spring, a ratchet wheel carried by and rotatable with said driving wheel, a rack interconnecting said ratchet wheel and said saddle, a T-shaped stirrup on said frame in front of the attached end of said spring, and bifurcated means connected to said saddle.

8. A tricycle comprising, in combination, a frame, a pair of steering wheels rotatably carried at one end of the frame, a driving wheel rotatably carried at the other end of said frame, a leaf spring bent back upon itself having one end attached to the frame, a saddle carried upon the other end of said spring, a ratchet wheel carried by and rotatable with said driving wheel, a reciprocally mounted rack for interconnecting said ratchet wheel and said saddle, a pawl for limiting rotation of said ratchet wheel to one direction, stop elements for limiting the period of movement of said rack, a bifurcated stirrup on said frame, and bifurcated means connected to said saddle.

9. In a tricycle of the type having a pair of steering wheels and a driving wheel rotatably carried upon a frame, the combination with a spring dependent saddle and mechanism for actuating said driving wheel, of a rigid bifurcated member adjacent the front of said saddle and a T-shaped, rigid stirrup on said frame directly ahead of the attached end of said spring for constraining a propellant's thighs and feet in position.

RALPH BURNES.
STANLEY S. HARRIS.

REFERENCES CITED

The following references are of record in the file of this patent:

UNITED STATES PATENTS

| Number | Name | Date |
| --- | --- | --- |
| 222,861 | Brasch | Dec. 23, 1879 |
| 529,717 | Deacon | Nov. 27, 1894 |
| 1,276,168 | Buchholz | Aug. 20, 1918 |
| 1,632,405 | Harrison | June 14, 1927 |
| 2,018,381 | Rumsey | Oct. 22, 1935 |